(12) United States Patent
Cai et al.

(10) Patent No.: US 8,599,740 B2
(45) Date of Patent: Dec. 3, 2013

(54) INTRA-DONOR CELL COORDINATED MULTI-POINT TRANSMISSION WITH TYPE 1 RELAY

(75) Inventors: Zhijun Cai, Euless, TX (US); Yi Yu, Irving, TX (US)

(73) Assignee: BlackBerry Limited, Waterloo, Ontario (CA)

(*) Notice: Subject to any disclaimer, the term of this patent is extended or adjusted under 35 U.S.C. 154(b) by 1 day.

(21) Appl. No.: 13/357,412

(22) Filed: Jan. 24, 2012

(65) Prior Publication Data

US 2012/0120866 A1    May 17, 2012

Related U.S. Application Data

(63) Continuation of application No. 12/683,242, filed on Jan. 6, 2010.

(51) Int. Cl.
*H04W 48/12*    (2009.01)
*H04W 88/04*    (2009.01)
*H04L 12/00*    (2006.01)

(52) U.S. Cl.
USPC .................. 370/315; 370/312; 370/329

(58) Field of Classification Search
None
See application file for complete search history.

(56) References Cited

U.S. PATENT DOCUMENTS

| | | | |
|---|---|---|---|
| 7,933,549 B2 | 4/2011 | Larsson | |
| 2008/0160912 A1 | 7/2008 | Kim et al. | |
| 2009/0175214 A1* | 7/2009 | Sfar et al. | 370/315 |
| 2009/0207794 A1 | 8/2009 | Meylan | |
| 2009/0313518 A1 | 12/2009 | Shen et al. | |
| 2010/0189026 A1* | 7/2010 | Lee et al. | 370/312 |
| 2010/0322148 A1 | 12/2010 | Liu et al. | |
| 2010/0323684 A1 | 12/2010 | Cai et al. | |
| 2011/0007685 A1* | 1/2011 | Ma et al. | 370/315 |
| 2011/0026473 A1 | 2/2011 | Luo et al. | |
| 2011/0051654 A1* | 3/2011 | Blankenship et al. | 370/315 |
| 2011/0090808 A1 | 4/2011 | Chen et al. | |
| 2011/0096701 A1 | 4/2011 | Lin | |
| 2011/0164550 A1 | 7/2011 | Chen et al. | |
| 2011/0194412 A1* | 8/2011 | Park et al. | 370/241 |
| 2012/0069790 A1 | 3/2012 | Chung et al. | |

FOREIGN PATENT DOCUMENTS

| | | |
|---|---|---|
| CN | 101170351 A | 4/2008 |
| CN | 101296020 A | 10/2008 |
| CN | 101383681 A | 3/2009 |
| EP | 2112845 A1 | 10/2009 |

OTHER PUBLICATIONS

Advisory Action dated Aug. 7, 2012; U.S. Appl. No. 12/683,236, filed Jan. 6, 2010; 3 pages.
Cai, Zhijun, et al.; U.S. Appl. No. 12/683,236, filed Jan. 6, 2010; Title: Intra-Donor Cell Coordinated Multi-Point Transmission with Type 1 Relay.

(Continued)

*Primary Examiner* — Marsha D Banks Harold
*Assistant Examiner* — Matthew Campbell
(74) *Attorney, Agent, or Firm* — Conley Rose, P.C.; J. Robert Brown, Jr.

(57) ABSTRACT

A method is provided for communication in a wireless telecommunications system. The method comprises an access node performing a coordinated multi-point (CoMP) transmission with a relay node toward a user equipment, wherein the access node provides CoMP control information via at least one of a relay physical downlink control channel and a relay physical downlink shared channel.

12 Claims, 6 Drawing Sheets

(56) References Cited

OTHER PUBLICATIONS

Cai, Zhijun, et al.; U.S. Appl. No. 12/683,242, filed Jan. 6, 2010; Title: Intra-Donor Cell Coordinated Multi-Point Transmission with Type 1 Relay.
Cai, Zhijun, et al.; U.S. Appl. No. 12/683,245, filed Jan. 6, 2010; Title: Intra-Donor Cell Coordinated Multi-Point Transmission with Type 1 Relay.
3GPP TSG-WG2 Meeting #65; R2-091112; Change Request; 25.331 CR rev-8.5.0; Athens, Greece; Feb. 9-13, 2009; 3 pages.
3GPP TSG-RAN WG2 Meeting #66; MCCH/MTCH MBMS Areas; 6.3.1; Discussion decision; Huawei; R2-092969; San Francisco, USA; May 4-8, 2009; 2 pages.
3GPP TSG RAN WG1 Meeting #57bis; 15.3; Discussion on Relay in CoMP; Discussion and decision; Huawei; R1-092371; Los Angeles, USA; Jun. 29-Jul. 3, 2009; 3 pages.
3GPP TSG RAN WG1 Meeting #58; On the COMP intra-cell based on Type I relay; 15.3; Discussion; Potevio; R1-093445; Shenzhen, China; Aug. 24-28, 2009; 6 pages.
3GPP TSG-RAN1 #54; Discussion on DL Coordinated Multipoint Transmission; 12; Fujitsu; R1-083115; Jeju, Korea; Aug. 18-22, 2008; 7 pages.
3GPP TSG RAN WG1 Meeting #56; Discussion on Information Exchange Aspects of DL CoMP; 12.2 Coordinated Multipoint Transmission/Reception (CoMP); Panasonic; R1-090686; Athens, Greece; Feb. 9-13, 2009; 5 pages.
3GPP TSG RAN WG2 #65bis; Considerations on Relay Architecture; 7; ETRI; R1-092425; Seoul, Korea; Mar. 23-27, 2009; 4 pages.
3GPP TSG-RAN WG1 Meeting #56bis; CoMP Scheduling Considering Different Types of Relay Nodes; Discussion/ Decision; LG Electronics Inc.; R1-091190; Seoul, Korea; Mar. 23-27, 2009; 3 pages.
3GPP TSG-RAN WG1 Meeting 57; Control Signalling for Relay Nodes; Discussion, Decision; Panasonic; R1-091737; San Francisco, USA; May 4-8, 2009; 4 pages.
3GPP TSG-RAN WG1 Meeting #57; Considerations on Coexistence of Different Types of Relays; Discussion/Decision; LG Electronics Inc.; R1-092117; San Francisco, USA; May 4-8, 2009, 2 pages.
3GPP TSG RAN WG1 Meeting #55; Relaying for LTE-Advanced; Discussion; Alcatel Shanghai Bell, Alcatel-Lucent; R1-084136; Prague, Czech Republic; Nov. 10-14, 2008; 6 pages.
3GPP TSG-RAN WG2 Meeting #66bis; TP to 36.912 on Relays and Carrier Aggregation; Discussion and Decision; Nokia Siemens Networks; R2-093694; Los Angeles, U.S.A.; Jul. 3-29, 2009; 6 pages.
3GPP TSG RAN WG1 Meeting #59; Intra-Donor Cell eNB-Relay CoMP and its Performance Analysis; Dicussion and Decision; Research in Motion UK Limited; R1-094465; Jeju, Korea; Nov. 9-13, 2009; 4 pages.
3GPP TR 36.814; 3rd Generation Partnership Project; Technical Specification Group Radio Access Network; Further Advancements for E-UTRA Physical Layer Aspects; (Release 9); Nov. 2009; 53 pages; V1.5.0 Technical Report; 3GPP Organizational Partners.
3GPP TR 36.814; 3rd Generation Partnership Project; Technical Specification Group Radio Access Network; Further Advancements for E-UTRA Physical Layer Aspects; (Release 9); Feb. 2009; 31 pages; V0.4.1 Technical Report; 3GPP Organizational Partners.
3GPP TS 36.331; 3rd Generation Partnership Project; Technical Specification Group Radio Access Network; Evolved Universal Terrestrial Radio Access (E-UTRA) Radio Resource Control (RRC); Protocol Specification; (Release 8); Jun. 2009; 207 pages; V8.6.0 Technical Specification; 3GPP Organizational Partners.
3GPP TS 36.321; 3rd Generation Partnership Project; Technical Specification Group Radio Access Network; Evolved Universal Terrestrial Radio Access (E-UTRA) Medium Access Control (MAC) Protocol Specification; (Release 8); Jun. 2009; 47 pages; V8.6.0 Technical Specification; 3GPP Organizational Partners.
European Extended Search Report; EP Application No. 11150332.2; May 30, 2011, 7 pages.
European Extended Search Report; EP Application No. 11150333.0; Apr. 27, 2011; 12 pages.
European Extended Search Report; EP Application No. 11150334.8; Mar. 31, 2011; 12 pages.
Office Action dated Sep. 19, 2011; U.S. Appl. No. 12/683,242, filed Jan. 6, 2010; 31 pgs.
Office Action dated Feb. 14, 2012; U.S. Appl. No. 12/683,245, filed Jan. 6, 2010; 20 pages.
Office Action dated Jan. 30, 2012; U.S. Appl. No. 12/683,236, filed Jan. 6, 2010; 21 pages.
Final Office Action dated May 29, 2012; U.S. Appl. No. 12/683,236, filed Jan. 6, 2010; 12 pages.
Notice of Allowance dated May 22, 2012; U.S. Appl. No. 12/683,245, filed Jan. 6, 2010; 11 pages.
Notice of Allowance dated Jul. 2, 2013; U.S. Appl. No. 12/683,236, filed Jan. 6, 2010; 17 pages.
Office Action dated Jun. 20, 2013; U.S. Appl. No. 12/683,242, filed Jan. 6, 2010; 34 pages.
Canadian Office Action; Application No. 2,727,065; May 17, 2013; 3 pages.
Chinese Office Action; Application No. 201110036787.3; Apr. 19, 2013; 7 pages.
Chinese Office Action; Application No. 201110036751.5; May 2, 2013; 7 pages.
Chinese Office Action; Application No. 201110036790.5; May 30, 2013; 7 pages.
Office Action dated Mar. 25, 2013; U.S. Appl. No. 12/683,236, filed Jan. 6, 2010; 11 pages.
Office Action dated Apr. 1, 2013; U.S. Appl. No. 12/683,242, filed Jan. 6, 2010; 6 pages.
European Examination Report; EP Application No. 11150332.2; Mar. 19, 2013; 4 pages.
Canadian Office Action; Application No. 2,726,950; Feb. 5, 2013; 3 pages.

* cited by examiner

ID

INTRA-DONOR CELL COORDINATED MULTI-POINT TRANSMISSION WITH TYPE 1 RELAY

CROSS-REFERENCE TO RELATED APPLICATIONS

This application is a continuation which claims benefit of and priority to U.S. patent application Ser. No. 12/683,242 filed Jan. 6, 2010, by Zhijun Cai, et al. entitled "Intra-Donor Cell Coordinated Multi-Point Transmission with Type 1 Relay," (37327-1-US-PAT-4214-23000) which is incorporated by reference herein as if reproduced in its entirety.

BACKGROUND

As used herein, the terms "user equipment" and "UE" can refer to wireless devices such as mobile telephones, personal digital assistants, handheld or laptop computers, and similar devices that have telecommunications capabilities. Such a UE might consist of a wireless device and its associated Universal Integrated Circuit Card (UICC) that includes a Subscriber Identity Module (SIM) application, a Universal Subscriber Identity Module (USIM) application, or a Removable User Identity Module (R-UIM) application or might consist of the device itself without such a card. The term "UE" may also refer to devices that have similar wireless capabilities but that are not transportable, such as desktop computers, set-top boxes, or network appliances. The term "UE" can also refer to any hardware or software component that can terminate a communication session for a user. Also, the terms "user equipment," "UE," "user agent," "UA," "user device" and "user node" might be used synonymously herein.

As telecommunications technology has evolved, more advanced network access equipment has been introduced that can provide services that were not possible previously. This network access equipment might include systems and devices that are improvements of the equivalent equipment in a traditional wireless telecommunications system. Such advanced or next generation equipment may be included in evolving wireless communications standards, such as Long Term Evolution (LTE) and LTE-Advanced (LTE-A). For example, an LTE or LTE-A system might include an Evolved Universal Terrestrial Radio Access Network (E-UTRAN) node B (eNB), a wireless access point, or a similar component rather than a traditional base station. As used herein, the term "access node" will refer to any component of a wireless network, such as a traditional base station, a wireless access point, or an LTE or LTE-A eNB, that creates a geographical area of reception and transmission coverage allowing a UE or a relay node to access other components in a telecommunications system. An access node may comprise a plurality of hardware and software.

The term "access node" may not refer to a "relay node," which is a component in a wireless network that is configured to extend or enhance the coverage created by an access node or another relay node. The access node and relay node are both radio components that may be present in a wireless communications network, and the terms "component" and "network node" may refer to an access node or a relay node. It is understood that a component might operate as an access node or a relay node depending on its configuration and placement. However, a component is called a "relay node" only if it requires the wireless coverage of an access node or another relay node to access other components in a wireless communications system. Additionally, two or more relay nodes may be used serially to extend or enhance coverage created by an access node.

These systems can include protocols such as a Radio Resource Control (RRC) protocol, which is responsible for the assignment, configuration, and release of radio resources between a UE and a network node or other equipment. The RRC protocol is described in detail in the Third Generation Partnership Project (3GPP) Technical Specification (TS) 36.331, which is incorporated herein by reference for all purposes.

The signals that carry data between UEs, relay nodes, and access nodes can have frequency, time, space, and coding parameters and other characteristics that might be specified by a network node. A connection between any of these elements that has a specific set of such characteristics can be referred to as a resource. The terms "resource," "communications connection," "channel," and "communications link" might be used synonymously herein. A network node typically establishes a different resource for each UE or network node with which it is communicating at any particular time.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Figure 1:
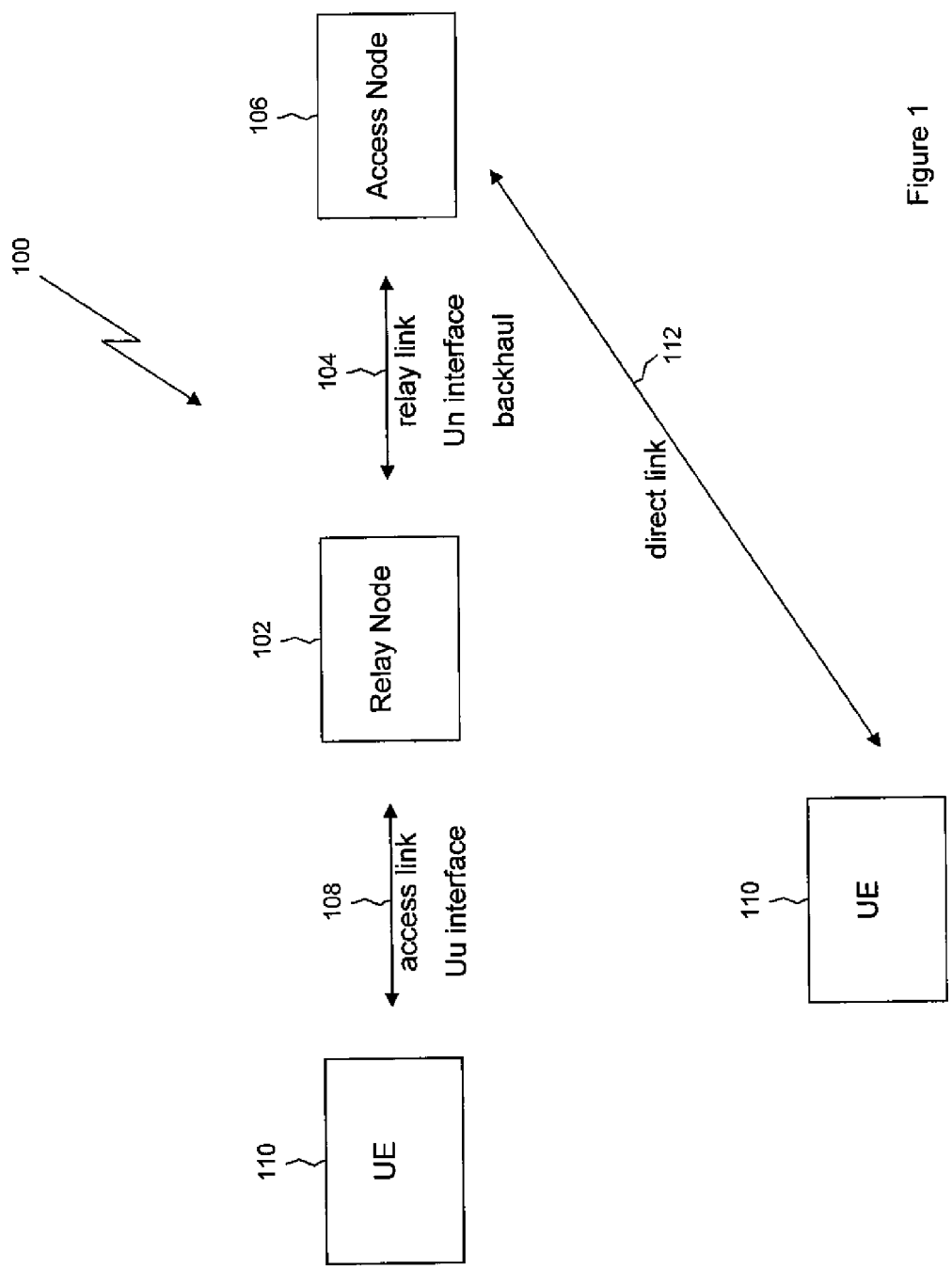
FIG. 1 is a diagram illustrating a wireless communication system that includes a relay node, according to an embodiment of the disclosure.

FIG. 1 is a diagram illustrating a wireless communication system 100 in which embodiments of the present disclosure may be implemented. Examples of the wireless communication system 100 include LTE or LTE-A networks, and all of the disclosed and claimed embodiments could be implemented in an LTE-A network. A relay node 102 can receive a signal from a UE 110 and transmit the signal to an access node 106, which could also be referred to as a donor eNB (DeNB). A cell controlled by a DeNB can be referred to as a donor cell. In some implementations of the relay node 102, the relay node 102 receives a signal with data from the UE 110 and then generates a new signal to transmit the data to the access node 106. The relay node 102 can also receive data from the access node 106 and deliver the data to the UE 110.

The relay node 102 might be placed near the edges of a cell so that the UE 110 can communicate with the relay node 102 rather than communicating directly with the access node 106 for that cell. In radio systems, a cell is a geographical area of reception and transmission coverage. Cells can overlap with each other. In a typical situation, one access node is associated with each cell. The size of a cell is determined by factors such as frequency band, power level, and channel conditions. One or more relay nodes, such as relay node 102, can be used to enhance coverage within a cell or to extend the size of coverage of a cell. Additionally, the use of a relay node 102 can enhance the throughput of a cell because the UE 110 can access the relay node 102 at a higher data rate than the UE 110 might use when communicating directly with the access node 106 for that cell, thus creating higher spectral efficiency. The use of a relay node 102 can also decrease the UE's battery usage by allowing the UE 110 to transmit at a lower power.

When the UE 110 is communicating with the access node 106 via the relay node 102, the links that allow wireless communication can be said to be of three distinct types. The communication link between the UE 110 and the relay node 102 is said to occur over an access link 108, which can also be referred to as the Uu interface. The communication between the relay node 102 and the access node 106 is said to occur over a relay link 104, which can also be referred to as the Un interface or the backhaul link. Communication that passes directly between the UE 110 and the access node 106 without passing through the relay node 102 is said to occur over a direct link 112.

Relay nodes can be divided into three kinds: layer one relay nodes, layer two relay nodes, and layer three relay nodes. A layer one relay node is essentially a repeater that can retransmit a transmission without any modification other than amplification and possibly slight delay (or some other simple layer 1 operations). A layer two relay node can demodulate/decode a transmission that it receives, re-modulate/re-encode the demodulated/decoded data, and then transmit the re-modulated/re-encoded data. A layer three relay node can have full radio resource control capabilities and can thus function similarly to an access node. The illustrative embodiments herein are primarily concerned with layer three relay nodes.

The radio resource control protocols used by a relay node may be the same as those used by an access node, and the relay node may have a unique cell identity. Relay nodes known as Type 1 relay nodes may have their own physical cell IDs and transmit their own synchronization signals and reference symbols. In addition, a UE can receive scheduling information and hybrid automatic repeat request (HARQ) feedback directly from a Type 1 relay node and send its control channels (such as a scheduling request (SR), a channel quality indicator (CQI), and/or an acknowledgement (ACK)) to a Type 1 relay node. To a Release 10 UE, a Type 1 relay node may appear as a different entity than an access node to allow for further performance enhancement, but to a Release 8 UE, a Type 1 relay node appears as a Release 8 access node (i.e., it is backward compatible). The embodiments disclosed herein deal primarily with Type 1 relay nodes for simplicity. However, the disclosed embodiments may also apply to other types of relays, for example, Type 2 relays.

Relay nodes known as Type 2 relay nodes do not have separate cell IDs and thus do not create any new cells. That is, a Type 2 relay node does not transmit a physical ID that is different from the access node ID. A Type 2 relay node can relay signals to and from legacy (LTE Release 8) UEs, but Release 8 UEs are not aware of the presence of Type 2 relay nodes. A Type 2 relay node can also relay signals to and from LTE-A Release 10 and later UEs. LTE-A Release 10 and later UEs might be aware of the presence of a Type 2 relay node. As used herein, the term "Release 10" refers to any UE capable of following LTE standards later than LTE Release 8 or LTE Release 9, the term "Release 8" refers to any UE capable of following only the LTE standards of LTE Release 8, and the term "Release 9" refers to any UE capable of following the LTE standards of LTE Release 8 and Release 9.

The concept of coordinated multi-point transmission and reception (CoMP) has recently been introduced to improve transmission quality and capacity in wireless telecommunications networks. With CoMP, a plurality of access nodes can transmit to and receive from one or more UEs in a plurality of overlapping cells. Prior to a CoMP transmission, the access nodes may coordinate with one another in order to agree on the scheduling for the CoMP transmission, the modulation and coding scheme (MCS) for the CoMP transmission, the transmission mode for the CoMP transmission, the multi-antenna functions, the pre-coding matrix index (PMI), the rank indicator (RI), allocated resource block information, and other scheduling and control information that will be used for the CoMP transmissions. Hereinafter, any such information will be referred to as CoMP control information.

When a plurality of access nodes transmit to a UE using the agreed-upon CoMP control information, the transmissions can constructively overlay one another at the location of that particular UE. The coordinated transmissions do not interfere with transmissions intended for other UEs, and potentially interfering transmissions intended for other UEs are greatly reduced at the location of the UE receiving the coordinated transmission. In this way, CoMP can greatly improve a UE's reception in regions of overlapping cells. Details of CoMP operations can be found in 3GPP TS 36.814, which is incorporated herein by reference for all purposes.

In an embodiment, CoMP is used for transmissions made by at least one access node and at least one relay node. Due to the close coupling between an access node and a Type 1 relay node inside a donor cell, CoMP may improve system performance. For example, the efficient backhaul between the access node and the relay node may be used to allow fast collaboration for CoMP purposes. As described in detail below, functions that are performed solely by an access node in traditional CoMP are split between the access node and the relay node in the embodiments herein. Also, several techniques are provided herein for exchanging CoMP-related information between the access node and the relay node.

The transmission power of an access node is typically much higher than that of a relay node. For example, the transmission power of an access node could be 46 dBm, while the transmission power of a relay node could be 30 dBm. Therefore, in practice, a relay node can cover only a small area. For UEs at the edge of a relay cell and close to an access node, it may be beneficial to use CoMP technology to further improve the throughput. Advantages of using CoMP include the fact that the access node needs to transmit data to the relay node in any event for forwarding purposes. Hence, the access node always has a copy of the data available, and there may be no need for extra forwarding from the relay node to the access node. Also, fast backhaul control signaling is available via the relay physical downlink control channel (R-PDCCH) or the relay physical downlink shared channel (R-PDSCH). Hence, the coordination between the access node and the relay node can be quite efficient. In addition, the access node can provide master control of the CoMP operations, such as centralized scheduling.

Figure 2:
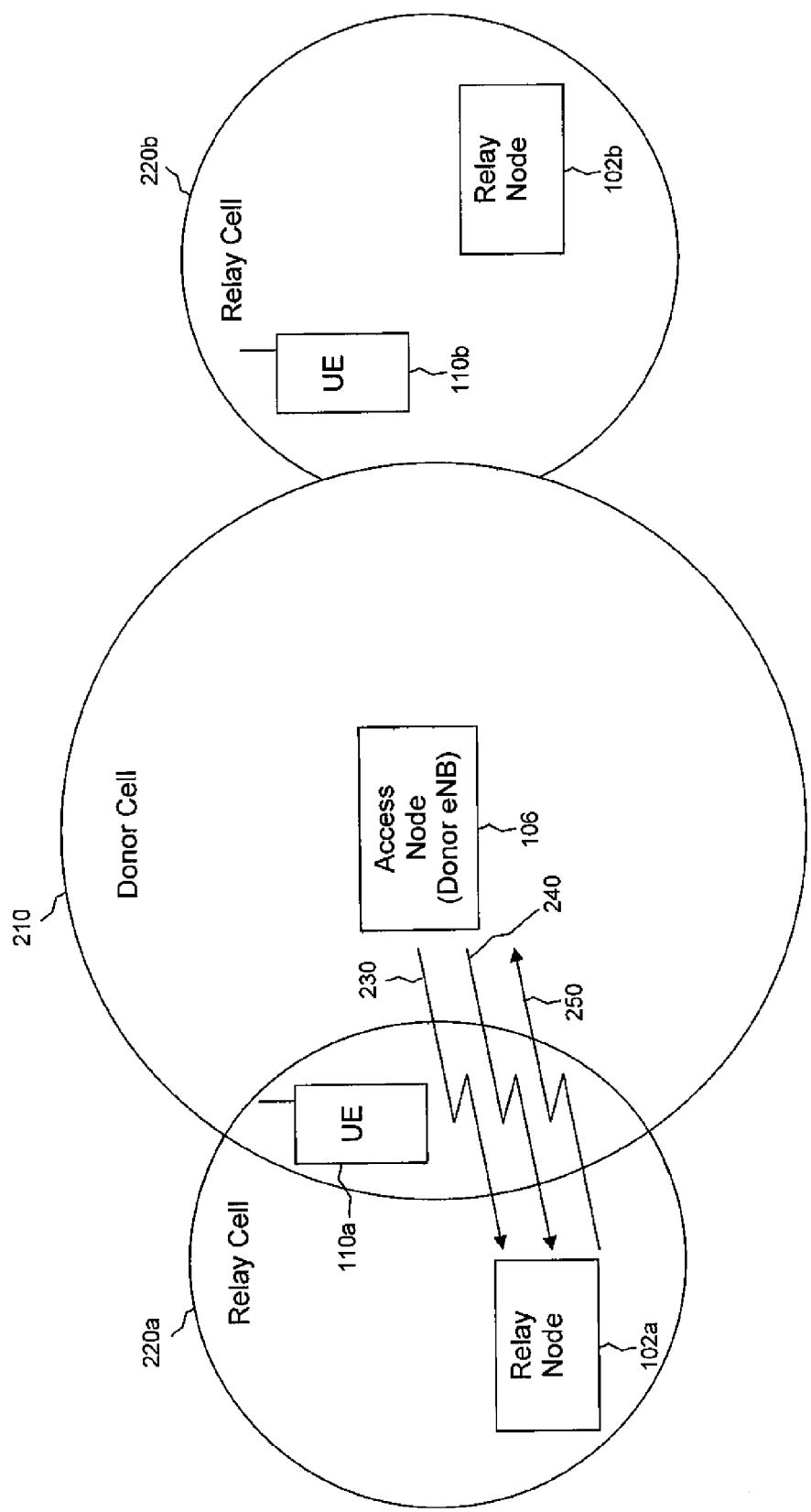
FIG. 2 is a diagram of an illustrative telecommunications system including a donor cell and a plurality of relay cells, according to an embodiment of the disclosure.

A system in which these concepts might be implemented is illustrated in FIG. 2, where a donor cell 210 is served by an access node 106 or DeNB. A plurality of relay nodes 102 are present, which may create relay cells 220 that overlap the boundaries of the donor cell 210. Two relay cells 220 are shown, but other numbers of relay cells might be present. An R-PDCCH 230 and an R-PDSCH 240 carry control plane data and user plane data, respectively, from the access node 106 to the relay node 102. A relay physical uplink shared channel (R-PUSCH) 250 carries user plane data from the relay node 102 to the access node 106.

A plurality of UEs 110 can communicate with the access node 106 and/or one or more of the relay nodes 102. In this example, two UEs 110 are shown, but in other embodiments other numbers of UEs 110 could be present. In an embodiment, since UE 110a is in a region overlapped by the donor cell 210 and the relay cell 220a, CoMP may be performed by the access node 106 and the relay node 102a for transmissions to UE 110a. Since UE 110b is not in a region overlapped by the donor cell 210 and the relay cell 220b, CoMP may not be performed efficiently for UE 110b.

In traditional CoMP, an access node 106 acts as both a master controller and a serving node. That is, the access node 106 makes decisions about functions such as the scheduling of transmissions and/or the selection of a modulation and coding scheme and/or the specification of other CoMP control information as described above. These functions can be referred to as master control functions, and an entity performing these functions can be referred to as a master control or master controller. After making these decisions, the access node 106 then transmits the CoMP control information to the UE 110 so that the UE 110 can properly receive CoMP-based transmissions from a plurality of access nodes 106. The transmission of CoMP control information to the UE 110 can be referred to as a serving node function, and an entity performing these functions can be referred to as a serving node.

In an embodiment, when at least one access node 106 is involved in CoMP-based transmissions with at least one relay node 102, the master control functions and the serving node function are split between the access node 106 and the relay node 102. At least three different options exist for how these functions can be split. In the first option, the access node 106 performs the master control functions and also acts as the serving node. The relay node 102 may forward resource availability information to the access node 106. The access node 106 then decides the scheduling information, transmission mode, MCS, PMI, RI, and other CoMP control information, and delivers the CoMP control information to the relay node 102 for the coordinated transmission. The access node 106 also acts as a serving node and delivers the CoMP control information to the UE 110.

In the second and third options, the relay node 102 acts as the serving node. In the second option, the access node 106 forwards resource availability information and user data to the relay node 102 and maintains a copy of the user data. The relay node 102 then acts as a master control and makes the decisions about the CoMP control information. The relay node 102 then forwards the CoMP control information to the access node 106 and acts as a serving node in delivering the CoMP control information to the UE 110.

In the third option, the access node 106 behaves as the master control. The relay node 102 forwards to the access node 106 the channel information it has received from the UE 110 and/or resource availability information (together with other information). The access node 106 makes the master control decisions and sends the CoMP control information to the relay node 102. The relay node 102 then acts as the serving node and delivers the CoMP control information to the UE 110 over the PDCCH.

In an embodiment, the third option is used for CoMP-based transmissions from one or more relay nodes 102 and one or more access nodes 106. That is, the access node 106 acts as the master control in the CoMP operations, and the relay node 102 acts as the CoMP serving node. When this option is used, the access node 106 can have more information for smart CoMP decisions, such as coordinating among multiple relay nodes 102 in the same donor cell 210.

Regardless of whether the CoMP control information is delivered to the UE 110 by the access node 106 or the relay node 102, the CoMP control information might need to be exchanged between the access node 106 and the relay node 102. In an embodiment, there are three different ways for the CoMP control information to be delivered over the backhaul between the access node 106 and the relay node 102. In a first alternative, the access node 106 sends the CoMP control information to the relay node 102 over the R-PDCCH as layer 1 control information. In some cases, layer 2 or layer 3 multi-user multiplexing may be applied over the backhaul link to improve the spectrum efficiency. For example, multiplexing of medium access control (MAC) protocol data units (PDUs) may be performed. The R-PDCCH may need to incorporate CoMP control information for multiple UEs in this case. In different embodiments, CoMP control information for each UE is identified by a user ID or is implicitly identified by the transmission order.

Figure 3:
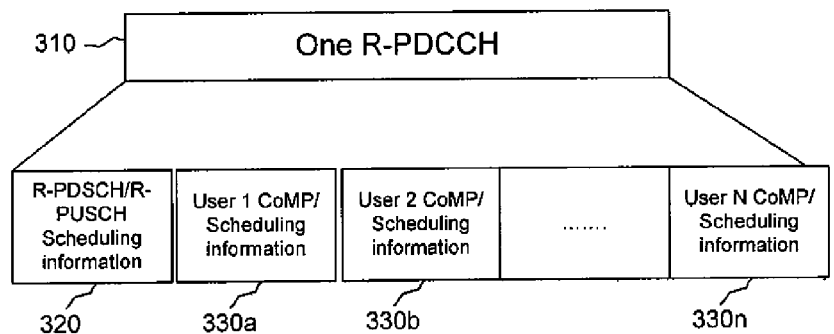
FIG. 3 is a diagram of an R-PDCCH, according to an embodiment of the disclosure.

An example of this first scheme is shown in FIG. 3. An R-PDCCH 310 includes a first portion 320 that contains R-PDSCH/R-PUSCH scheduling information. That is, portion 320 of the R-PDCCH 310 contains scheduling information that the access node 106 provides to the relay node 102 so that the access node 106 and the relay node 102 can exchange user plane data with one another. The R-PDCCH 310 also includes a plurality of portions 330 that contain the CoMP control information, with each of the portions 330 containing CoMP control information for a different user or UE or group of UEs. Each portion 330 may include an identifier for the UE to which that portion 330 pertains. Alternatively, the UEs to which the portions 330 pertain may be specified by the order of the portions 330. Since a relay physical downlink control channel exists only on the downlink from the access node 106 to the relay node 102, this first alternative is available only when the access node 106 provides the CoMP control information to the relay node 102.

In the second and third alternatives, the access node 106 and the relay node 102 exchange the CoMP control information over either the R-PDSCH or the R-PUSCH. Since a shared channel exists on the both the uplink and the downlink between the access node 106 and the relay node 102, the second and third alternatives are available when the access node 106 provides the CoMP control information to the relay node 102 and when the relay node 102 provides the CoMP control information to the access node 106.

Figure 4:
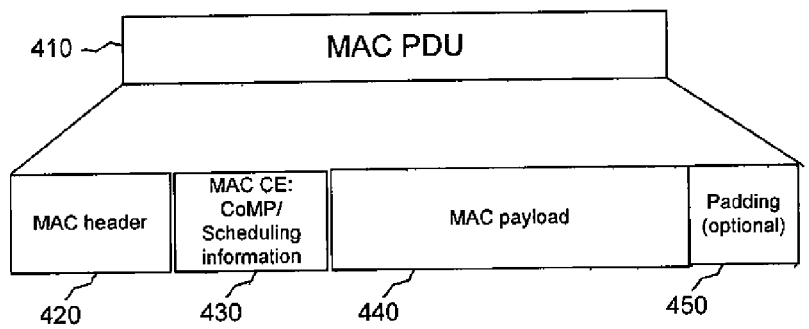
FIG. 4 is a diagram of a MAC PDU, according to an embodiment of the disclosure.

In the second alternative, the CoMP control information is transmitted as layer 2 information. For example, the CoMP control information might be transmitted as a MAC control element that may be concatenated with a MAC PDU from the same user. An example of this second scheme is shown in FIG. 4, where a MAC PDU 410 includes a MAC header 420, a MAC control element 430, a MAC payload 440, and optional padding 450. The MAC control element 430 contains the CoMP control information.

Figure 5:
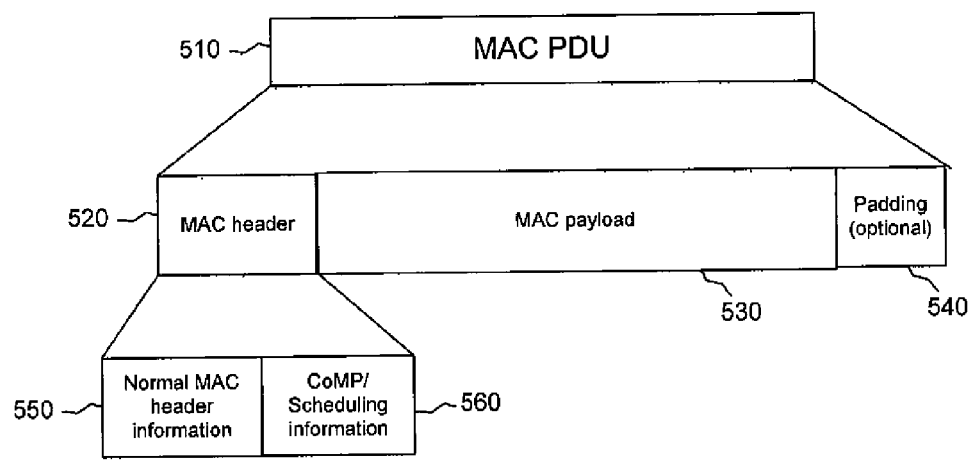
FIG. 5 is a diagram of a MAC PDU, according to an alternative embodiment of the disclosure.

In the third alternative, the CoMP control information is placed inside a MAC header. This scheme is quite flexible and can work well when multi-user multiplexing is applied over the backhaul link. An example of this scheme is shown in FIG. 5, where a MAC PDU 510 includes a MAC header 520, a MAC payload 530, and optional padding 540. The MAC header 520 contains normal MAC header information 550 and CoMP control information 560. The normal MAC header information 550 may include, for example, in LTE Release 8, one or multiple MAC PDU subheaders. Details of the normal MAC header and MAC subheader can be found in 3GPP TS 36.321, which is incorporated herein by reference for all purposes. In other embodiments, the CoMP control information may be transmitted within the MAC payload and/or the MAC tailor (at the end of the MAC PDU). In yet other embodiments, the CoMP control information may be transmitted as layer 3 control signaling, such as Radio Resource Control (RRC) signaling. The above embodiments apply to both the R-PDSCH and R-PUSCH.

Figure 6:
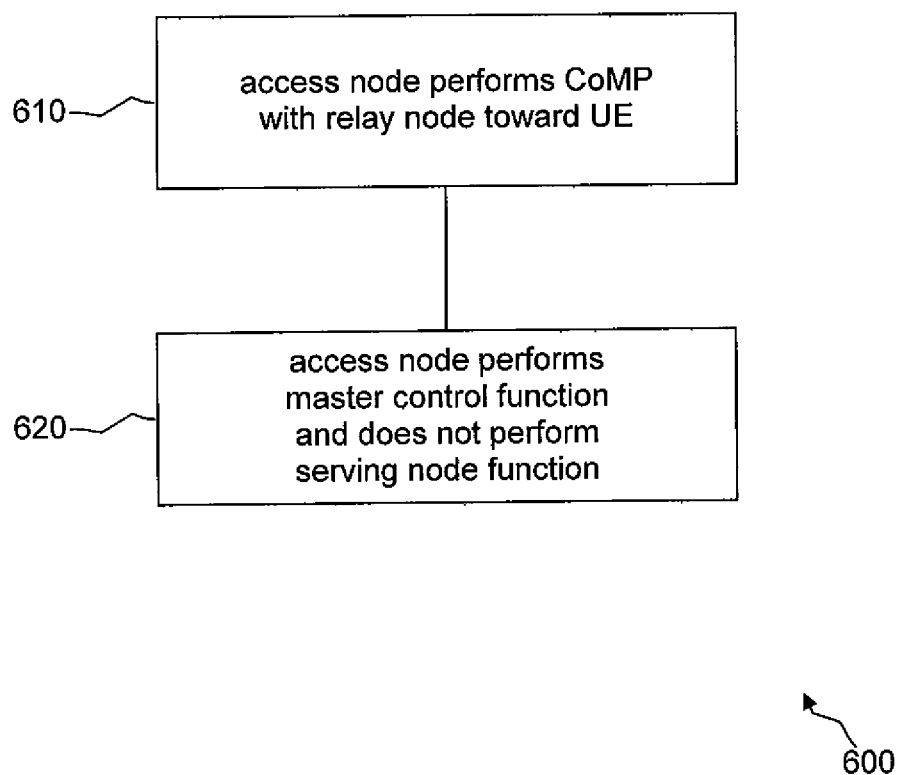
FIG. 6 illustrates an embodiment of a method for communication in a wireless telecommunications system, according to an embodiment of the disclosure.

FIG. 6 illustrates an embodiment of a method 600 for communication in a wireless telecommunications system. At block 610, an access node performs a CoMP transmission with a relay node toward a user equipment. At block 620, the access node performs at least one master control function and does not perform at least one serving node function.

Figure 7:
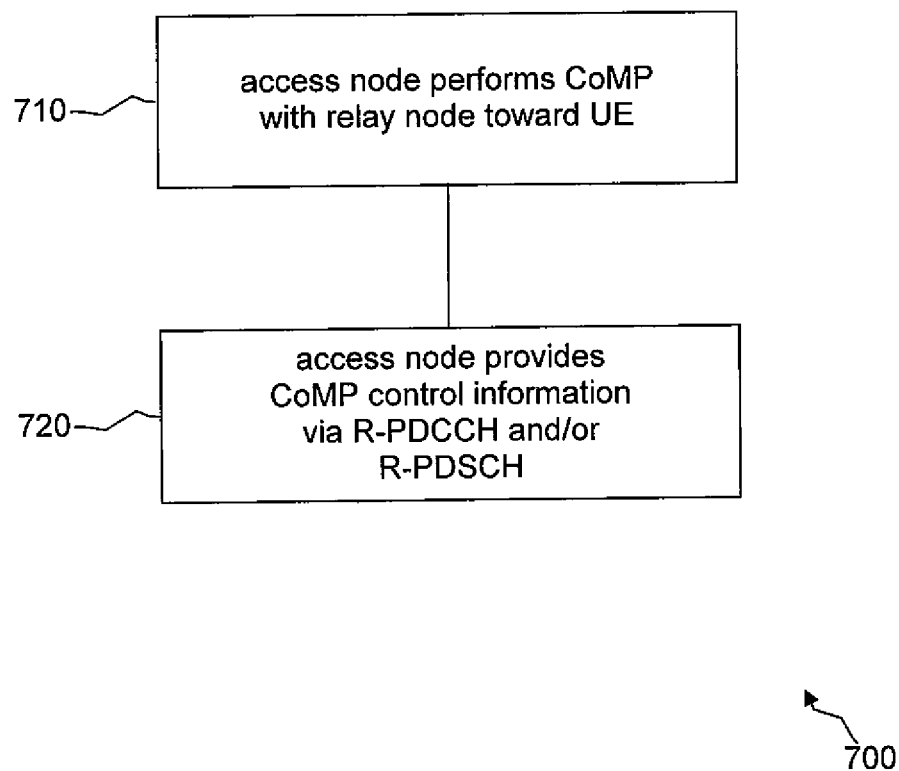
FIG. 7 illustrates an embodiment of a method for communication in a wireless telecommunications system, according to an alternative embodiment of the disclosure.

FIG. 7 illustrates an embodiment of an alternative method 700 for communication in a wireless telecommunications system. At block 710, an access node performs a CoMP transmission with a relay node toward a user equipment. At block 720, the access node provides CoMP control information via the R-PDCCH and/or the R-PDSCH.

Figure 8:
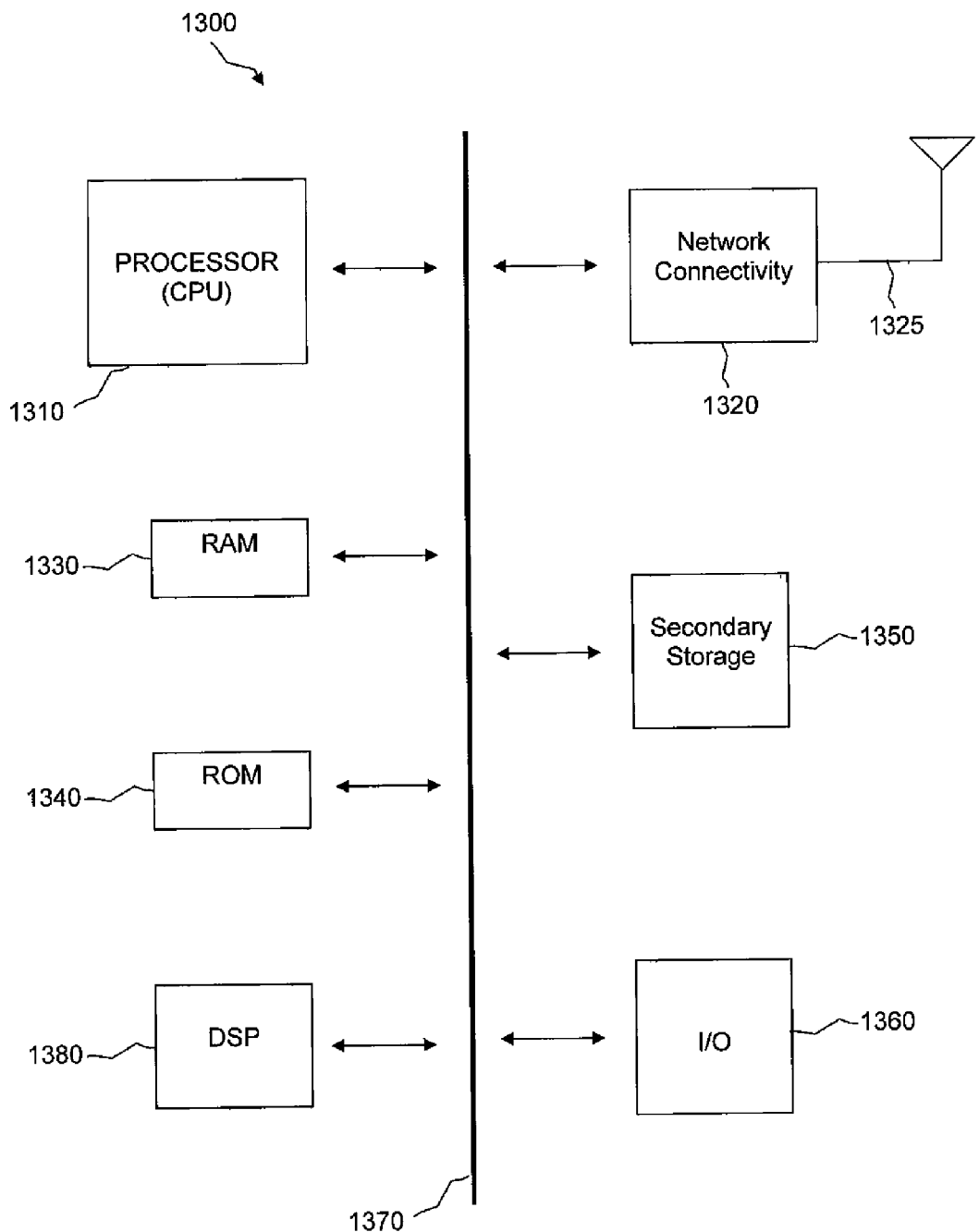
FIG. 8 illustrates a processor and related components suitable for implementing the several embodiments of the present disclosure.

The UE 110, access node 106, relay node 102, and other components described above might include a processing component that is capable of executing instructions related to the actions described above. FIG. 8 illustrates an example of a system 1300 that includes a processing component 1310 suitable for implementing one or more embodiments disclosed herein. In addition to the processor 1310 (which may be referred to as a central processor unit or CPU), the system 1300 might include network connectivity devices 1320, random access memory (RAM) 1330, read only memory (ROM) 1340, secondary storage 1350, and input/output (I/O) devices 1360. These components might communicate with one another via a bus 1370. In some cases, some of these components may not be present or may be combined in various combinations with one another or with other components not shown. These components might be located in a single physical entity or in more than one physical entity. Any actions described herein as being taken by the processor 1310 might be taken by the processor 1310 alone or by the processor 1310 in conjunction with one or more components shown or not shown in the drawing, such as a digital signal processor (DSP) 1380. Although the DSP 1380 is shown as a separate component, the DSP 1380 might be incorporated into the processor 1310.

The processor 1310 executes instructions, codes, computer programs, or scripts that it might access from the network connectivity devices 1320, RAM 1330, ROM 1340, or secondary storage 1350 (which might include various disk-based systems such as hard disk, floppy disk, or optical disk). While only one CPU 1310 is shown, multiple processors may be present. Thus, while instructions may be discussed as being executed by a processor, the instructions may be executed simultaneously, serially, or otherwise by one or multiple processors. The processor 1310 may be implemented as one or more CPU chips.

The network connectivity devices 1320 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, worldwide interoperability for microwave access (WiMAX) devices, digital subscriber line (xDSL) devices, data over cable service interface specification (DOCSIS) modems, and/or other well-known devices for connecting to networks. These network connectivity devices 1320 may enable the processor 1310 to communicate with the Internet or one or more telecommunications networks or other networks from which the processor 1310 might receive information or to which the processor 1310 might output information.

The network connectivity devices 1320 might also include one or more transceiver components 1325 capable of transmitting and/or receiving data wirelessly in the form of electromagnetic waves, such as radio frequency signals or microwave frequency signals. Alternatively, the data may propagate in or on the surface of electrical conductors, in coaxial cables, in waveguides, in optical media such as optical fiber, or in other media. The transceiver component 1325 might include separate receiving and transmitting units or a single transceiver. Information transmitted or received by the transceiver component 1325 may include data that has been processed by the processor 1310 or instructions that are to be executed by processor 1310. Such information may be received from and outputted to a network in the form, for example, of a computer data baseband signal or signal embodied in a carrier wave. The data may be ordered according to different sequences as may be desirable for either processing or generating the data or transmitting or receiving the data. The baseband signal, the signal embedded in the carrier wave, or other types of signals currently used or hereafter developed may be referred to as the transmission medium and may be generated according to several methods well known to one skilled in the art.

The RAM 1330 might be used to store volatile data and perhaps to store instructions that are executed by the processor 1310. The ROM 1340 is a non-volatile memory device that typically has a smaller memory capacity than the memory capacity of the secondary storage 1350. ROM 1340 might be used to store instructions and perhaps data that are read during execution of the instructions. Access to both RAM 1330 and ROM 1340 is typically faster than to secondary storage 1350. The secondary storage 1350 is typically comprised of one or more disk drives or tape drives and might be used for non-volatile storage of data or as an over-flow data storage device if RAM 1330 is not large enough to hold all working data. Secondary storage 1350 may be used to store programs that are loaded into RAM 1330 when such programs are selected for execution.

The I/O devices 1360 may include liquid crystal displays (LCDs), touch screen displays, keyboards, keypads, switches, dials, mice, track balls, voice recognizers, card readers, paper tape readers, printers, video monitors, or other well-known input/output devices. Also, the transceiver 1325 might be considered to be a component of the I/O devices 1360 instead of or in addition to being a component of the network connectivity devices 1320.

The following are incorporated herein by reference for all purposes: 3GPP TS 36.321, 3GPP TS 36.331, and 3GPP TS 36.814.

In an embodiment, a method is provided for communication in a wireless telecommunications system. The method comprises an access node performing a coordinated multi-point (COMP) transmission with a relay node toward a user equipment, wherein the access node provides CoMP control information via at least one of a relay physical downlink control channel and a relay physical downlink shared channel.

In an embodiment, an alternative method is provided for communication in a wireless telecommunications system. The method comprises a relay node performing a coordinated multi-point (COMP) transmission with an access node toward a user equipment, wherein the relay node provides CoMP control information via a relay physical uplink shared channel.

In another embodiment, an access node in a wireless telecommunications system is provided. The access node includes a processor configured such that the access node performs a coordinated multi-point (CoMP) transmission with a relay node toward a user equipment, wherein the access node provides CoMP control information via at least one of a relay physical downlink control channel and a relay physical downlink shared channel.

In another embodiment, a relay node in a wireless telecommunications system is provided. The relay node includes a processor configured such that the relay node performs a coordinated multi-point (CoMP) transmission with an access node toward a user equipment, wherein the relay node provides CoMP control information via a relay physical uplink shared channel.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method for communication in a wireless telecommunications system, comprising:
    performing, by an access node, a coordinated multi-point (CoMP) transmission with a relay node toward a plurality of user equipment (UEs), wherein the access node is configured to provide CoMP control information via a relay physical downlink control channel (R-PDCCH),
    wherein the access node is further configured to transmit the CoMP control information to the relay node over the R-PDCCH, and
    wherein the R-PDCCH comprises:
        a first portion that includes scheduling information for at least one of a relay physical downlink shared channel (R-PDSCH) and a relay physical uplink shared channel (R-PUSCH); and
        a plurality of second portions, each of the plurality of second portions including CoMP control information for a CoMP transmission to a specific UE of the plurality of UEs, the specific UE being identified in the each of the plurality of second portions based on at least one of:
            a user identifier; or
            an order of transmission of the second portions.

2. The method of claim 1, wherein the CoMP control information comprises at least one of:
    a schedule for the CoMP transmission;
    a modulation and coding scheme for the CoMP transmission;
    a transmission mode for the CoMP transmission;
    a multi-antenna function;
    a pre-coding matrix index;
    a rank indicator; and
    allocated resource block information.

3. The method of claim 1, wherein the access node determines the CoMP control information and the relay node transmits the CoMP control information to the user equipment.

4. An access node in a wireless telecommunications system, comprising:
    a processor configured such that the access node performs a coordinated multi-point (CoMP) transmission with a relay node toward a plurality of user equipment (UEs), wherein the access node is configured to provide CoMP control information via a relay physical downlink control channel (R-PDCCH),
    wherein the access node is further configured to transmit the CoMP control information to the relay node over the R-PDCCH, and
    wherein the R-PDCCH comprises:
        a first portion that includes scheduling information for at least one of a relay physical downlink shared channel (R-PDSCH) and a relay physical uplink shared channel (R-PUSCH); and
        a plurality of second portions, each of the plurality of second portions including CoMP control information for a CoMP transmission to a specific UE of the plurality of UEs, the specific UE being identified in the each of the plurality of second portions based on at least one of:
            a user identifier; or
            an order of transmission of the second portions.

5. The access node of claim 4, wherein the CoMP control information comprises at least one of:
    a schedule for the CoMP transmission;
    a modulation and coding scheme for the CoMP transmission;
    a transmission mode for the CoMP transmission;
    a multi-antenna function;
    a pre-coding matrix index;
    a rank indicator; and
    allocated resource block information.

6. The access node of claim 4, wherein the access node determines the CoMP control information and the relay node transmits the CoMP control information to the user equipment.

7. A wireless communications system, comprising
an access node configured to perform a coordinated multi-point (CoMP) transmission with a relay node toward a plurality of user equipment (UEs);
the access node further configured to:
provide CoMP control information via a relay physical downlink control channel (R-PDCCH); and
transmit the CoMP control information to the relay node over the R-PDCCH,
wherein the R-PDCCH comprises:
a first portion that includes scheduling information for at least one of a relay physical downlink shared channel (R-PDSCH) and a relay physical uplink shared channel (R-PUSCH); and
a plurality of second portions, each of the plurality of second portions including CoMP control information for a CoMP transmission to a specific UE of the plurality of UEs, the specific UE being identified in the each of the plurality of second portions based on at least one of:
a user identifier; or
an order of transmission of the second portions.

8. The wireless communications system of claim 7, wherein the CoMP control information comprises at least one of:
a schedule for the CoMP transmission;
a modulation and coding scheme for the CoMP transmission;
a transmission mode for the CoMP transmission;
a multi-antenna function;
a pre-coding matrix index;
a rank indicator; and
allocated resource block information.

9. The wireless communications system of claim 7, wherein the access node determines the CoMP control information and the relay node transmits the CoMP control information to the user equipment.

10. A non-transitory computer readable medium storing computer readable instructions executable by a processor of a computing device to cause said device to implement the steps of a method for communication in a wireless telecommunications system, comprising:
performing, by an access node, a coordinated multi-point (CoMP) transmission with a relay node toward a plurality of user equipment (UEs), wherein the access node is configured to provide CoMP control information via a relay physical downlink control channel (R-PDCCH),
wherein the access node is further configured to transmit the CoMP control information to the relay node over the R-PDCCH, and
wherein the R-PDCCH comprises:
a first portion that includes scheduling information for at least one of a relay physical downlink shared channel (R-PDSCH) and a relay physical uplink shared channel (R-PUSCH); and
a plurality of second portions, each of the plurality of second portions including CoMP control informations for a CoMP transmission to a specific UE of the plurality of UEs, the specific UE being identified in the each of the plurality of second portions based on at least one of:
a user identifier; or
an order of transmission of the seconds portions.

11. The non-transitory computer readable medium of claim 10, wherein the CoMP control information comprises at least one of:
a schedule for the CoMP transmission;
a modulation and coding scheme for the CoMP transmission;
a transmission mode for the CoMP transmission;
a multi-antenna function;
a pre-coding matrix index;
a rank indicator; and
allocated resource block information.

12. The non-transitory computer readable medium of claim 10, wherein the access node determines the CoMP control information and the relay node transmits the CoMP control information to the user equipment.

\* \* \* \* \*